US008656472B2

(12) United States Patent
McMurtry et al.

(10) Patent No.: US 8,656,472 B2
(45) Date of Patent: Feb. 18, 2014

(54) REQUEST-SPECIFIC AUTHENTICATION FOR ACCESSING WEB SERVICE RESOURCES

(75) Inventors: Craig V. McMurtry, Sammammish, WA (US); Alexander T. Weinert, Seattle, WA (US); Vadim Meleshuk, Redmond, WA (US); Mark E. Gabarra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 12/024,901

(22) Filed: Feb. 1, 2008

(65) Prior Publication Data

US 2008/0263652 A1 Oct. 23, 2008

Related U.S. Application Data

(60) Provisional application No. 60/912,986, filed on Apr. 20, 2007.

(51) Int. Cl.
*H04L 29/06* (2006.01)

(52) U.S. Cl.
USPC .............................. 726/9; 713/185; 713/186

(58) Field of Classification Search
USPC ....................................... 726/9; 713/185, 186
See application file for complete search history.

(56) References Cited

U.S. PATENT DOCUMENTS

| 5,706,427 | A | 1/1998 | Tabuki |
| 6,167,517 | A | 12/2000 | Gilchrist et al. |
| 6,845,453 | B2 * | 1/2005 | Scheidt et al. ..................... 726/5 |
| 7,100,046 | B2 | 8/2006 | Balaz et al. |
| 7,287,271 | B1 * | 10/2007 | Riggins ............................. 726/3 |
| 2002/0099809 | A1 | 7/2002 | Lee |
| 2002/0112155 | A1 * | 8/2002 | Martherus et al. ............ 713/155 |
| 2002/0157029 | A1 | 10/2002 | French et al. |
| 2002/0169874 | A1 * | 11/2002 | Batson et al. ................. 709/225 |
| 2003/0135628 | A1 | 7/2003 | Fletcher et al. |
| 2003/0163694 | A1 | 8/2003 | Chen et al. |
| 2004/0139319 | A1 | 7/2004 | Favazza et al. |
| 2004/0177369 | A1 * | 9/2004 | Akins, III ........................ 725/31 |
| 2004/0187018 | A1 * | 9/2004 | Owen et al. .................... 713/200 |

(Continued)

FOREIGN PATENT DOCUMENTS

| CN | 1812403 A | 8/2006 |
| JP | 2002-288138 | 10/2002 |

(Continued)

OTHER PUBLICATIONS

O'Gorman, L.,Comparing passwords, tokens, and biometrics for user authentication,Proceedings of the IEEE, vol. 91 , Issue: 12, pp. 2021-2040.*

(Continued)

*Primary Examiner* — Peter Shaw
*Assistant Examiner* — Ali Shayanfar
(74) *Attorney, Agent, or Firm* — Merchant & Gould P.C.

(57) ABSTRACT

Requests for access to Web service resources are evaluated based on the type of request that is received. Requests are not granted unless sufficient proof of authentication is provided to grant that request. An authentication service evaluates one or more factors to determine whether or not to authenticate the client. After being authenticated by the authentication service, proof of authentication is provided to the Web service, which grants access to the Web service resource.

11 Claims, 6 Drawing Sheets

(56) References Cited

U.S. PATENT DOCUMENTS

| | | | |
|---|---|---|---|
| 2004/0210771 A1* | 10/2004 | Wood et al. | 713/201 |
| 2005/0015585 A1 | 1/2005 | Kurose | |
| 2005/0039054 A1 | 2/2005 | Satoh et al. | |
| 2005/0193211 A1* | 9/2005 | Kurose | 713/185 |
| 2005/0273844 A1 | 12/2005 | Dapkus et al. | |
| 2006/0053124 A1 | 3/2006 | Nishio et al. | |
| 2006/0095779 A9 | 5/2006 | Bhat et al. | |
| 2006/0155842 A1 | 7/2006 | Yeung et al. | |
| 2006/0156385 A1* | 7/2006 | Chiviendacz et al. | 726/2 |
| 2006/0206932 A1 | 9/2006 | Chong | |
| 2007/0022196 A1* | 1/2007 | Agrawal | 709/225 |
| 2007/0022301 A1* | 1/2007 | Nicholson et al. | 713/184 |
| 2007/0118745 A1* | 5/2007 | Buer | 713/168 |
| 2007/0234408 A1* | 10/2007 | Burch et al. | 726/6 |
| 2008/0098464 A1* | 4/2008 | Mizrah | 726/5 |

FOREIGN PATENT DOCUMENTS

| | | |
|---|---|---|
| JP | 2004-234415 | 8/2004 |
| JP | 2005-301424 | 10/2005 |
| JP | 2006-236281 | 9/2006 |
| JP | 2006-309595 | 11/2006 |
| JP | 2007-049343 | 2/2007 |
| JP | 2007-079992 | 3/2007 |
| WO | WO 2005069823 | 8/2005 |
| WO | 2008130760 A1 | 10/2008 |

OTHER PUBLICATIONS

Exhibit A, Angal et al; Building Identity-Enabled Web Services; Oct. 18, 2005; 10 pages.

Exhibit B, IBM; The iSeries Information Center; Copyright 2002, 2005; includes main page, table of contents, and section titled "Identity authentication method for Web services" totaling 5 pages.

Exhibit C, Wong et al.; A Web Services Security Testing Framework; Oct. 11, 2006; 103 pages.

PCT International Searching Authority, Search Report and Written Opinion for PCT/US2008/057375, Aug. 21, 2008, 6 pages.

Bajaj et al., Web Services Policy 1.2—Attachment, http://www.w3.org/SubmissionWS-PolicyAttachment/, Copyright 2004-2006, Apr. 25, 2006, 16 pages.

Notice of Rejection mailed on Mar. 1, 2013 in Japanese Patent Application No. 2010-504132 and English Translation.

The State Intellectual Property Office of the People's Republic of China, Notice on the First Office Action in Chinese Application No. 200880012470.2, mailed on May 25, 2011, 17 pages.

The State Intellectual Property Office of the People's Republic of China, Notice on the Second Office Action in Chinese Application No. 200880012470.2, mailed on Jan. 18, 2012, 14 pages.

The State Intellectual Property Office of the People's Republic of China, Decision on Rejection in Chinese Application No. 2008800124701, mailed on Jun. 19, 2012, 18 pages.

* cited by examiner

REQUEST-SPECIFIC AUTHENTICATION FOR ACCESSING WEB SERVICE RESOURCES

RELATED APPLICATIONS

This Application claims priority to U.S. Provisional Application No. 60/912,986 filed on Apr. 20, 2007, titled "MESSAGE-SPECIFIC AUTHENTICATION PROTOCOL FOR WEB SERVICES," the disclosure of which is hereby incorporated by reference in its entirety.

BACKGROUND

When a user attempts to access a protected remote resource over a network, such as the Internet, the user typically conforms to policy statements issued by a server that controls that resource. The policy statements provide a set of authentication and authorization rules required to initiate communication with a resource. For example, the policy statement may require a user to provide a password before accessing a resource. If the user provides a correct password, the user's identity is authenticated and access to the resource is allowed.

While the policy statement method of authentication works well in situations in which a single form of authentication is sufficient to initiate communication with a protected resource, policy statements do not work well in dynamic environments. In a dynamic environment, a single instance of authentication at the outset of communications between a client and a protected resource may not be enough. For example, when a user attempts to access a website with protected resources, it may initially be sufficient for the user to provide authentication by entering a password. However, once the user has access to the website, the user may attempt to change his or her password, update a directory, access a highly protected resource, or request the privileges of an elevated access group, such as the system administrator group. In such a case, the user is requesting to do more than simply view information. These actions have the potential to do a great deal of damage to the protected resource.

Some authentication methods require authentication before enabling communication with a resource. However, in a dynamic environment it is difficult to determine what authentication and authorization rules to apply until an actual request is received requesting access to a protected resource.

SUMMARY

Embodiments of the present disclosure relate to systems, methods, and data structures for message-specific authentication. One aspect is a computing system for controlling access to a protected Web service resource. The computing system includes a communication device, a processor, and memory. The communication device communicates across a communication network. The processor is communicatively connected to the communication device. The memory stores program instructions, which when executed by the processor cause the computing system to perform a method of controlling access to a protected Web service resource. The method includes receiving a first request from a client to access a protected Web service resource from the communication network; determining that the client has been authenticated according to a first factor; granting the first request to access the protected Web service resource based on authentication according to the first factor; receiving a second request from a client to access a protected Web service resource from the communication network; denying the second request to access the protected Web service resource based on the authentication according to the first factor being insufficient to grant the second request, determining that the client has been authenticated according to a second factor, and granting the second request to access the protected Web service resource based on authentication according to the second factor.

Another aspect is a method of authenticating a client for access to a Web service resource. The method includes: (i) receiving a request from a client to be authenticated; (ii) sending a challenge message to the client; (iii) receiving a confirmation response to the challenge message from the client; (iv) determining that the confirmation response meets a predetermined criterion; (v) determining that the request to be authenticated requires further authentication; (iv) repeating (ii) through (iv) with a second challenge message, a second confirmation response, and a second predetermined criterion; and (v) sending an authentication message to the client.

A further aspect relates to a computer readable medium containing computer executable instructions which when executed by a computer perform a method of controlling access to a protected resource, the method comprising: receiving a request from a client identifying the protected resource of a Web service; sending a response to the client requesting authentication from an authentication service; receiving an authentication token from the client after being authenticated from the authentication service; determining whether the authentication token is sufficient to grant the request; granting the request if the authentication token is sufficient; and denying the request if the authentication token is not sufficient to grant the request.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

Figure 1:
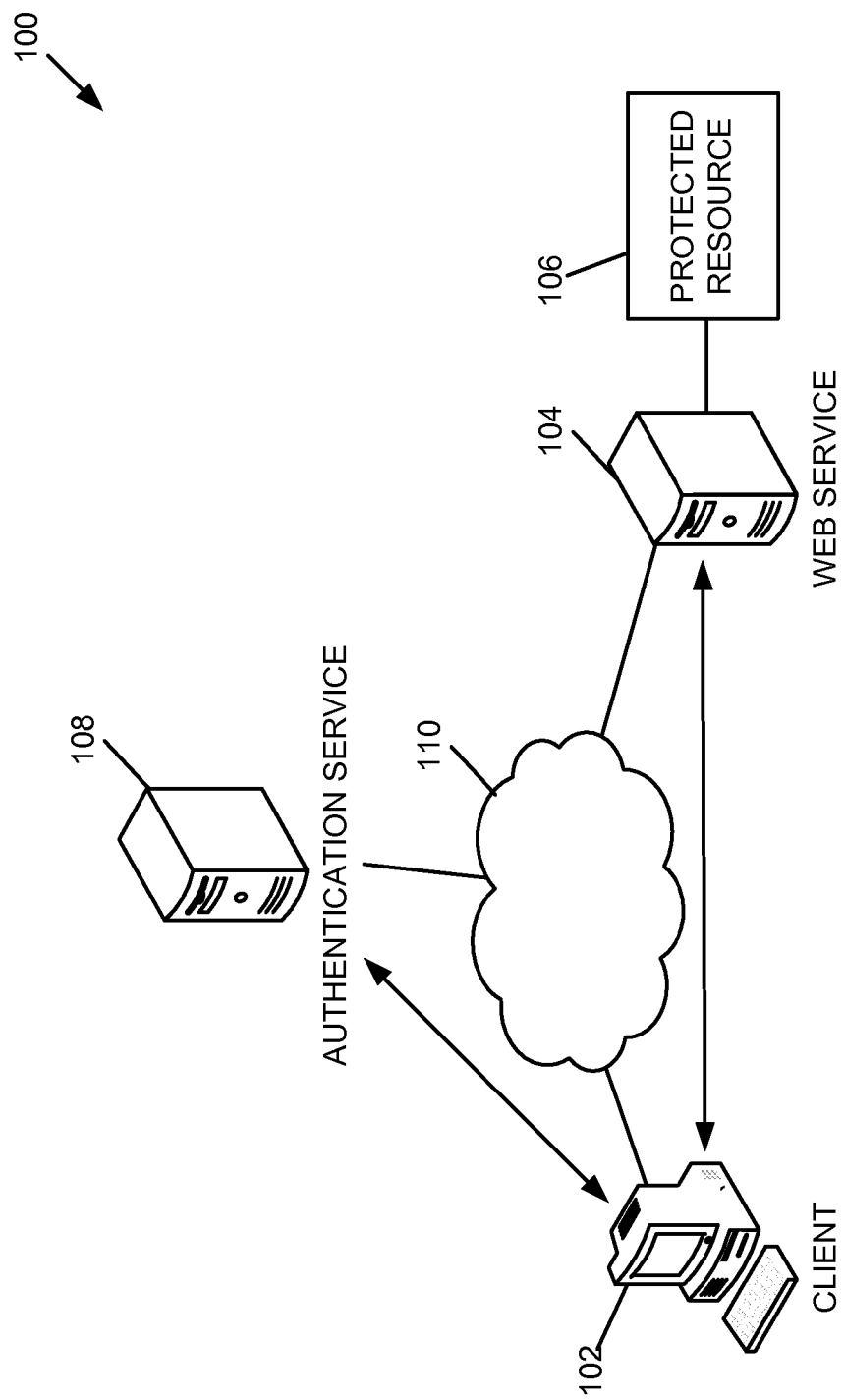
FIG. 1 is block diagram of an example system configured to perform dynamic authentication.

This disclosure will now more fully describe exemplary embodiments with reference to the accompanying drawings, in which specific embodiments are shown. Other aspects may, however, be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Some embodiments of the present disclosure relate to systems and methods for message-specific authentication. One aspect is a method of determining whether authentication is needed before a client is allowed to access a protected resource.

In general, authentication is a process of verifying the veracity of identity claims made by something, such as a computing system, a client, a system, or a person. Authenticating a computing system typically includes confirming its origin or source. Confirmation of origin or source is usually accomplished by comparing information about the computing system claiming a specific identity, such as place and time of manufacture, location on a network, physical location, identification number, and the like, to known information about the specific identity.

However, the act of authenticating a person involves, for example, confirming the person's identity. There are many different identifying characteristics that can be used for authentication. One method of identifying a person involves detecting biometric identifiers. This method of authentication requires the person claiming an identity to provide verification in the form of unique features of the person claiming the identity, such as DNA, fingerprint patterns, retinal patterns, etc. Another way a person's identity can be verified is by something the person knows. This method of authentication requires the person claiming an identity to provide verification in the form of personal information such as a password, pin number, etc. Yet another way a person's identity can be verified is by something the person has. This method of authentication requires the person claiming an identity to provide verification in the form of an object such as a key, security card, security token, credit card, etc. These methods of authentication may be used individually or together in a process known as multifactor authentication.

Generally, when authenticating a client, the process includes either authenticating a client or authenticating the identity of the person using the client. In one embodiment, the client may be a Web browser. In another embodiment, the client may be a program configured to make remote procedure calls, or any other application or program communicating with a protected resource.

In a dynamic environment, the types of authentication and the rules for authenticating a client vary depending upon the types of requests made for accessing a protected resource. For example, a message requesting to view a protected resource may require less strenuous authentication then a message requesting to modify the protected resource. In one embodiment, a protected resource is a private website that only specific users have access to. In another embodiment, a protected resource may be a private email group, protected data, protected methods, protected procedures, protected operations, or any other type of protected information or functionality that should be limited to specific users or clients.

FIG. 1 is a block diagram of an example system 100 configured to perform request-specific dynamic authentication. In the illustrated embodiment, system 100 includes client 102, Web service 104, and authentication service 108. Web service 104 includes protected resource 106. In this embodiment, client 102 desires to gain access to protected resource 106. Protected resource 106, however, is protected from being accessed by unauthenticated clients. Client 102, Web service 104, and authentication service 108 are configured to communicate across network 110. Network 110 is a data communication path. In one embodiment, network 110 is the Internet. In other embodiments, network 110 is a local area network, Intranet, wireless network, or any other communication path configured to communicate data from one computing system to another computing system.

In one embodiment, client 102 is a computing system. In other embodiments, client 102 is any computing system configured to communicate data across network 110. One example of client 102 is computing system 600, shown in FIG. 6. Client 102 is communicatively connected with Web service 104, and authentication service 108 through network 110. In some embodiments, client 102 can access protected resource 106 by sending messages to Web service 104. In another embodiment, client 102 sends messages directly to protected resource 106.

In one embodiment, Web service 104 is a computing system (e.g., computing system 600, shown in FIG. 6), such as a Web server, operating a Web service. In general, Web service 104 provides a useful functionality that can be accessed through network 110, using a data communication protocol. Web services can be used to provide an endless variety of useful functions. In one embodiment, Web service 104 is a server. In another embodiment, Web service 104 is a computing system application operating on a computing system communicatively connected to network 110. In some embodiments Web service 104 is a referenceable entity, processor, or resource to which Web service messages can be addressed.

Generally, some embodiments of Web service 104 monitor network 110 for messages sent from client 102 relating to protected resource 106. When a message is received, Web service 104 determines whether the message contains a request that requires the authentication of client 102. Authentication of client 102 is sometimes necessary prior to permitting client 102 to access protected resource 106, to control access to protected resource 106. If Web service 104 determines that authentication is needed, Web service 104 directs client 102 to authentication service 108.

In the illustrated embodiment, Web service 104 includes protected resource 106. Protected resources include, for example, functions performed by a Web service 104 and data stored by Web Service 104 that can only be accessed, used, or modified by an authenticated client. For example, if Web service 104 provides the service of maintaining a group distribution list, the group distribution list is a protected resource that can only be accessed, used, or modified by an authenticated client. As another example, protected resource 106 is an entry in a directory. In another embodiment, protected resource 106 is a record in a database. In another embodiment, protected resource 106 is a file or part of a file stored on a memory storage device. Other embodiments use other forms of protected resources 106.

In one embodiment, authentication service 108 is a computing system (e.g., computing system 600, shown in FIG. 6), such as a server communicatively connected to network 110. In another embodiment, authentication service 108 is a computing system running a software application located on a network. Authentication service 108 is configured to authenticate client 102. One example of authentication service 108 is a security token service endpoint. Although the illustrated embodiment shows an example of authentication service 108 being separate and distinct from Web service 104, in other embodiments, authentication service 108 and Web service 104 are operated on the same server.

If client 102 is authenticated to perform the request contained in its message to protected resource 106, Web service 104 communicates the results of the requested operation to client 102. However, in other possible embodiments, authentication service 108 communicates directly with web service 104, across network 110, such as to receive a request for authentication from web service 104, or to send proof of authentication to Web service 104.

In addition to authentication, it is sometimes desirable to control access to protected resources by requiring that a client not only be authenticated but also authorized. Authorization is described in U.S. Publication No. 2008/0263638 titled AUTHORIZATION FOR ACCESS TO WEB SERVICE RESOURCES, the entire disclosure of which is hereby incorporated by reference.

Figure 2:
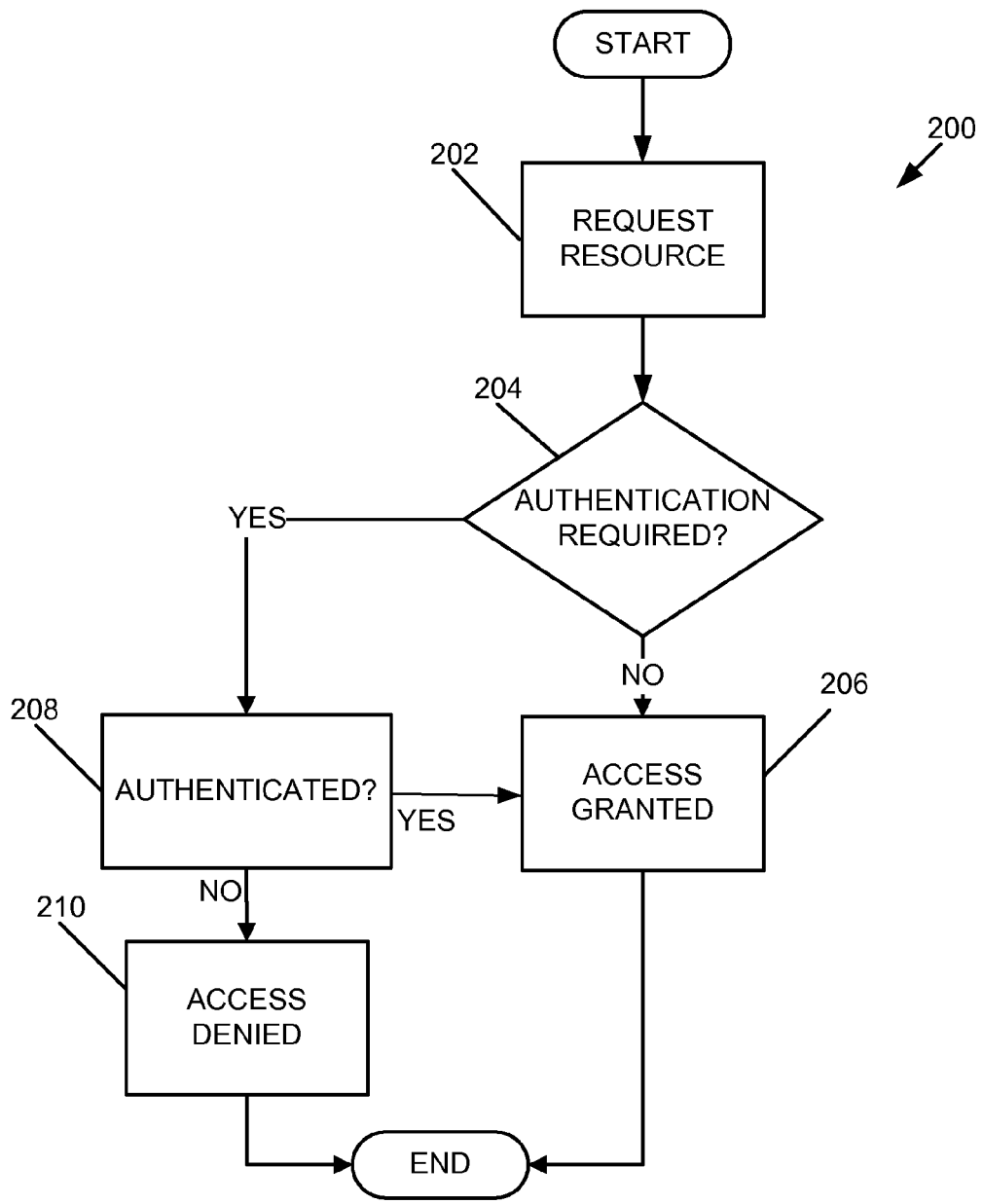
FIG. 2 is a flow chart illustrating an example method for dynamically determining whether authentication is required.

FIG. 2 is a flow chart illustrating an example method 200 for dynamically determining whether authentication is required. Method 200 includes operations 202, 204, 206, 208, and 210. Method 200 begins with operation 202 during which a resource request is made. In one embodiment, operation 202 involves communicating a message from client 102 to Web service 104 including a request to access protected resource 106. In some embodiments, the message is a remote procedure call. In another embodiment, the request may take the form of an email or any other type of electrical communication between client and a resource. In another embodiment, operation 202 involves client 102 sending a Create, Get, Put, Delete, or Enumerate request to Web service 104, such as commonly used in Web service communications.

After the resource request has been made, operation 204 is performed to evaluate the request and determine whether authentication is necessary. In one embodiment, the Web service analyzes the message sent from the client to the protected resource to determine whether the message contains a request that requires the client to provide authentication. In one embodiment, a client attempting to access a protected resource will not have to provide authentication if the client has previously provided the required authentication for the request. In another embodiment, the client will not have to provide authentication if the resource is a public resource, which is available to anyone that requests it. In another embodiment, even though a resource may be protected, authentication is not required if the message contains a request that does not require authentication, such as if the message is of a type that cannot damage the protected resource. If Web service 104 determines in operation 204 that authentication is not required, then operation 206 is performed. If authentication is required, then operation 208 is performed.

In one example, Web service 104 determines whether authentication is required by evaluating a number of considerations. These considerations include the medium by which the request is conveyed (such as a local area network versus remote access), the type of object to which the request pertains, the properties of the object to which the request pertains, and the quality of the credentials already included with the request. As to the quality of the credentials, for example, if the credentials are for a user from another organization, then depending on the resource that the user is trying to access, additional credentials may be required.

If authentication is not required, operation 206 is performed to grant access to the requested resource. The Web service grants access to the protected resource by, for example, sending a representation of the resource to the client, by performing a requested operation on the protected resource, or by sending the result of a requested operation to the client.

If, however, authentication is required, operation 208 is performed to perform the authentication. Authenticating the client will be discussed further in relation to FIG. 3. Examples of situations that require the client to provide authentication include instances where the client attempts to access or modify private websites, private email groups, protected data, protected methods, protected procedures, protected operations, or any other type of protected information or functionality. In some embodiments, Web service 104 challenges client 102 to provide authentication. Alternatively, Web service 104 directs the client to an authentication service (such as authentication service 108). Authentication service 108 can be located at Web service 104, located elsewhere from the Web service, or both as in the case of a distributed network. An example method of authenticating a client is illustrated and described with reference to FIG. 3.

After the client is authenticated, operation 206 is performed to grant the client access to the protected resource of the Web service. In one embodiment, the access is granted after the client provides an authentication token from the authentication service to the Web service. The Web service grants access to the protected resource, for example, by sending the resource to the client, by performing a requested operation on the protected resource, by directing the protected resource to perform a requested operation, or by sending the result of a requested operation to the client.

If it is determined that the client should not be authenticated, operation 210 is performed during which access is denied to the protected resource. In one example, access is denied because authentication service 108 does not provide an authentication token needed in order to gain access to the protected resource.

Figure 3:
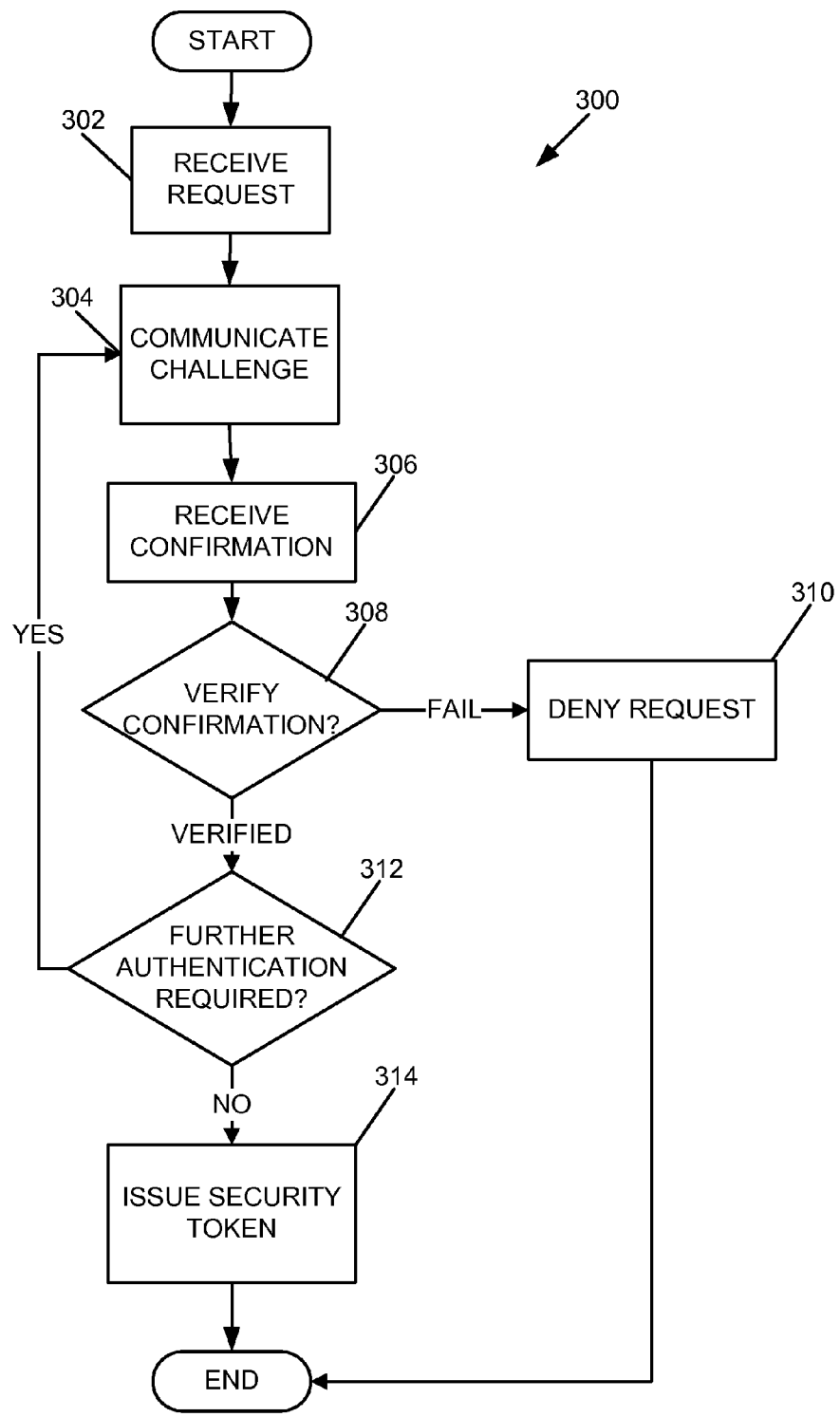
FIG. 3 is a flow chart illustrating an example method for authenticating a client.

FIG. 3 is a flow chart illustrating an example method 300 for authenticating a client. In one embodiment, method 300 corresponds with operation 208, shown in FIG. 2. Method 300 begins with operation 302, during which a request is made for authentication. In one embodiment, operation 302 involves a message being sent from client 102 to authentication service 108, and authentication service 108 receiving the request for authentication.

In the illustrated embodiment, after receiving the request for authentication, operation 304 is performed to communicate an authentication challenge. In one embodiment, authentication service 108 communicates a challenge to client 102 to test the veracity of the client or user's identity. In some embodiments, the challenge takes the form of requesting a password, requesting an answer to a security question, requesting a DNA sample, fingerprint patterns, retinal patterns, other forms of biometric identifiers, other unique identifiers of the person using the client, requesting verification in the form of an object such as a key, security card, security token, credit card, or some other object unique to the person using the client, requesting client specific information such as place and time of manufacture, location on a network, physical location, identification number, or requesting any other type of information that can be used for authentication purposes.

In the illustrated embodiment, once the challenge has been communicated, operation 306 is performed to receive a confirmation response to the challenge. Operation 306 involves providing the information, sample, identifier, and the like, that was requested in operation 304, and communicating it to authentication service 108. In one embodiment, an input device (e.g., input device 614, shown in FIG. 6) is used by the user of client 102 to provide the identifying information to client 102, which then communicates the information to authentication service 108. In some embodiments, a sensor is used (which is also a form of input device). For example, a user places a finger against a fingerprint scanner, which scans the fingerprint. The fingerprint data is then transmitted to authentication service 108. Various types of input devices can be used including a keyboard, mouse, touch pad, microphone, pen, biometric sensor, scanner, card reader, chemical detector, and the like. In other embodiments, data is entered into client 102 which is then communicated to authentication service 108.

In the illustrated embodiment, once the confirmation has been communicated, operation 308 is performed to verify the confirmation response. In one embodiment, the authentication service compares the confirmation response it received from the client 102 to known information about the claimed identity. For example, authentication service 108 retrieves data stored in a database, and compares that data to the confirmation response data. Authentication service 108 then determines whether the confirmation response matches the previously stored data. If so, the confirmation response is verified, and operation 312 is performed. If not, the confirmation response is not verified, and operation 310 is performed.

If the received confirmation response does not match the known information, operation 310 is performed in which access is denied to the requested resource. In another embodiment, authentication service 108 instead returns to operation 304 to retry authentication again. In such an embodiment, multiple retries may be permitted, such as three retries. If the retries are unsuccessful, operation 310 is performed to deny access to the protected resource.

If the received confirmation response matches the known information, operation 312 is then performed to determine whether further authentication is necessary. In one embodiment, authentication service 108 determines whether stronger forms of authentication are required, i.e. multifactor authentication requiring the client to provide multiple forms of authentication. If multifactor authentication is necessary, method 300 returns to operation 304 to communicate a second challenge. Operations 304, 306, 308, and 310 or 312 are then repeated as many times as desired. However, when repeated, the authentication challenge will take a different form than the previously issued challenge from the authentication service. For example, if the authentication service originally required the client to provide a password, it may require the client to use a smart card or biometric scanner during the second or subsequent rounds of verification. In some embodiments, any form of authentication can be used so long as the form of authentication differs in some way from the form previously used, such that authentication service 108 does not simply request the same information over and over. In most situations, repeatedly requesting the same information would not provide any additional authentication value. However, in some situations, repeated requests can be used, such as if a significant amount of time has passed since a previous challenge.

If further authentication is not required, operation 314 is then performed to issue an authentication token. Authentication service 108 returns a security token to the client, which the client uses as proof that the client has been authenticated. The authentication token is sent from client 102 to Web service 104, and Web service 104 then grants client 102 access to the originally requested protected resource.

Figure 4:
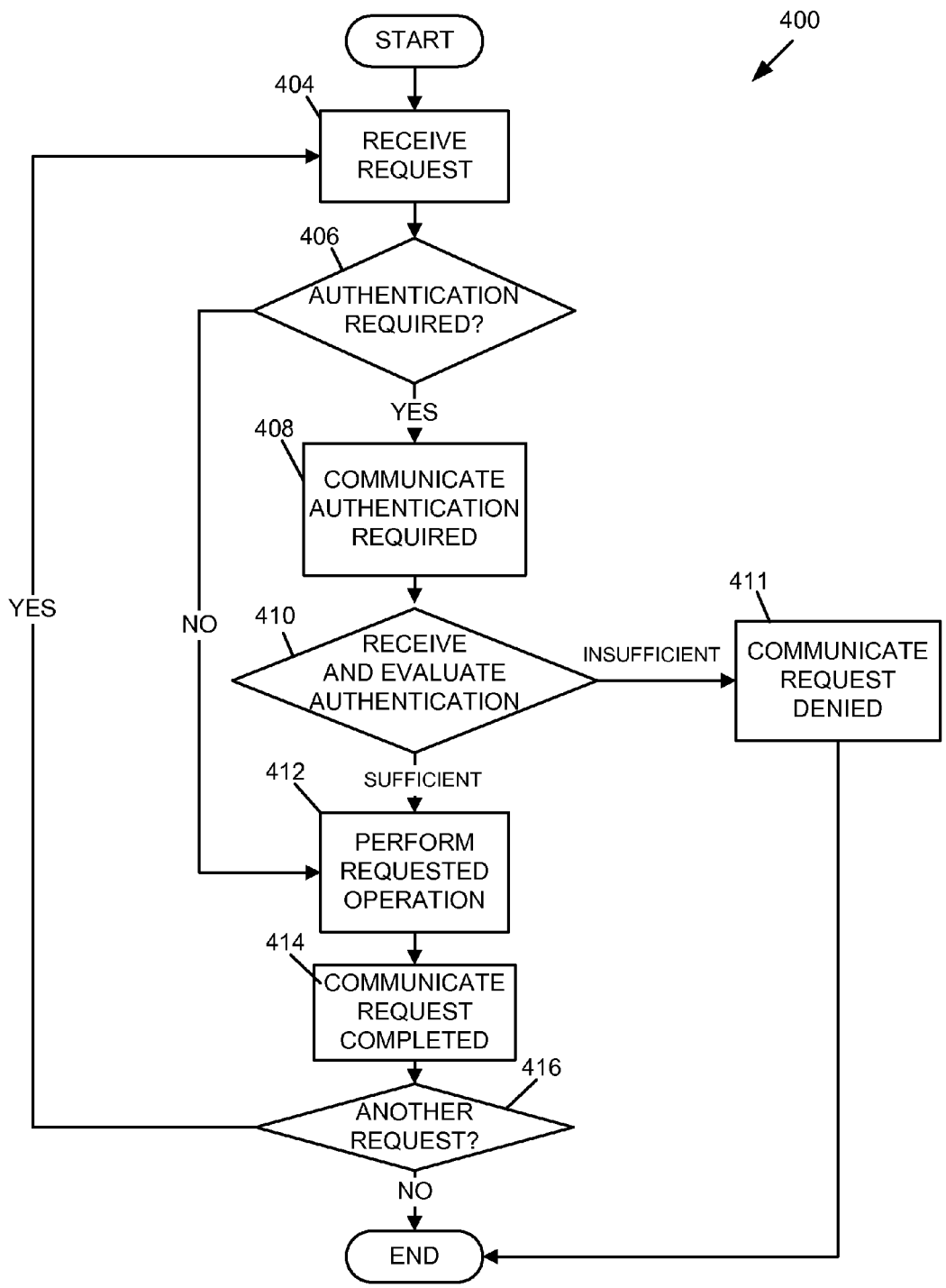
FIG. 4 is a flow chart illustrating an example method for dynamically controlling access to a protected resource.

FIG. 4 is a flow chart illustrating an example method 400 for dynamically controlling access to a protected resource. In one embodiment, method 400 is performed by Web service 104, in response to messages received from client 102, such as in an attempt to gain access to protected resource 106. Method 400 begins with operation 404, during which a request message is received. In one embodiment, Web service 104 receives a request from client 102 relating to protected resource 106. As a few examples, the request is a request to view the protected resource, to gain access to the protected resource, or to modify the protected resource.

In the illustrated embodiment, operation 406 is then performed to determine whether the request message contains a request that requires authentication. In one embodiment, Web service 104 analyzes the request to determine whether the request contained in the request requires authentication of the client. In some embodiments, a client attempting to access a protected resource will not have to provide authentication, for example, if the client has previously provided the required authentication for the request, if the resource is public and available to all, if the request type is one that contains a request that does not require authentication, or if the request type and its associated request cannot do damage to the protected resource. If authentication is not required, operation 414 is then performed to perform the requested operation.

In the illustrated embodiment, if the request contained in the message requires authentication, operation 408 is then performed to communicate that authentication is required. In one embodiment, operation 408 involves sending a message from Web service 104 to client 102 informing client 102 that authentication is required to perform the requested operation. In one embodiment, Web service 104 directs client 102 to authentication service 108 for authentication, such as described with reference to FIG. 3. For example, the message contains an address to an authentication provider. The client uses the address to locate the authentication provider, to attempt to receive authentication. In another embodiment, method 300 is performed by Web service 104, such that the message contains a challenge to client 102 requesting client 102 provide authentication information.

In the illustrated embodiment, if the client is successfully authenticated, operation 410 is then performed in which the authentication token is received. As described with reference to FIG. 3, the result of successful authentication is the receipt of an authentication token. That token is passed to Web service 104 to provide proof of the authentication. Web service 104 evaluates the token and verifies that the token is valid.

In some embodiments, evaluation of the token involves two steps. The first step involves public key cryptography. If the Web service 104 can decrypt the token using the public key of the authentication service 108, then Web service 104 determines that the token must have been issued by the authentication service 108. The second step includes deciding whether the claims made by the authentication service 108, about client 102, satisfy one or more conditions for access.

For example, in order for a particular protected resource 106 to be accessed, Web service 104 might require that three particular authentication processes be performed to authenticate client 102 to authentication service 108. As a result, Web service 104 evaluates the token received from client 102 to verify that it contains three claims by authentication service 108, asserting that client 102 has completed all three authentication processes. In other embodiments, any number of authentication processes are required. In some embodiments, the number and type of authentication process required is related to the type of request that is made. For example, requests involving higher risk will often require more stringent authentication processes.

In some embodiments, a number of authentication processes that completed successfully are referred to as authentication levels. In some embodiments, a low risk operation involving protected resource 106 requires only a low authentication level, such as one or two authentication levels. In some embodiments, a high risk operation requires a high authentication level, such as between three and five authentication levels. A single protected resource can be associated with various authentication levels, depending on the request that is being made. For example, a request to retrieve information from a protected resource may require only a low authentication level in some situations, while a request to delete information from a protected resource may require a moderate or high authentication level. In other situations, a request to retrieve information from a protected resource could require a high authentication level if the information is sensitive or confidential.

In the illustrated embodiment, if valid proof of authentication is not provided, or if the authentication provided is evaluated and determined to be insufficient, operation 411 is performed to deny access to the protected resource. In some embodiments, a message is sent to client 102 to inform client 102 of the denial. In some embodiments, the message also includes information on how to obtain proper authentication, such as to direct client 102 to authentication service 108.

In the illustrated embodiment, if proof of authentication is provided and verified as valid, the requested operation is performed in operation 412. In other words, access to the protected resource is granted. In some embodiments, operation 414 is then performed to inform the requester that the request was processed. For example, Web service 104 sends a message informing client 102 that the request was processed relating to the protected resource. In other examples, Web service 104 grants access to the protected resource by sending a representation of the resource 106 to client 102, by performing a requested operation on the protected resource 106, or by sending the result of a requested operation to client 102.

In the illustrated embodiment, operation 416 is then performed to monitor for the receipt of additional messages. For example, Web service 104 monitors for further communications from client 102 relating to resource 106. If client 102 sends additional messages to the resource 106, method 400 returns to operation 404 to evaluate whether the new message requires additional authentication through operations 404, 406, and 408. Although the client may have already authenticated itself at this point, in a dynamic environment the client may have to provide stronger forms of authentication, i.e., multifactor authentication, depending on the types of messages and requests it sends. If no more messages are received, then method 400 ends.

Figure 5:
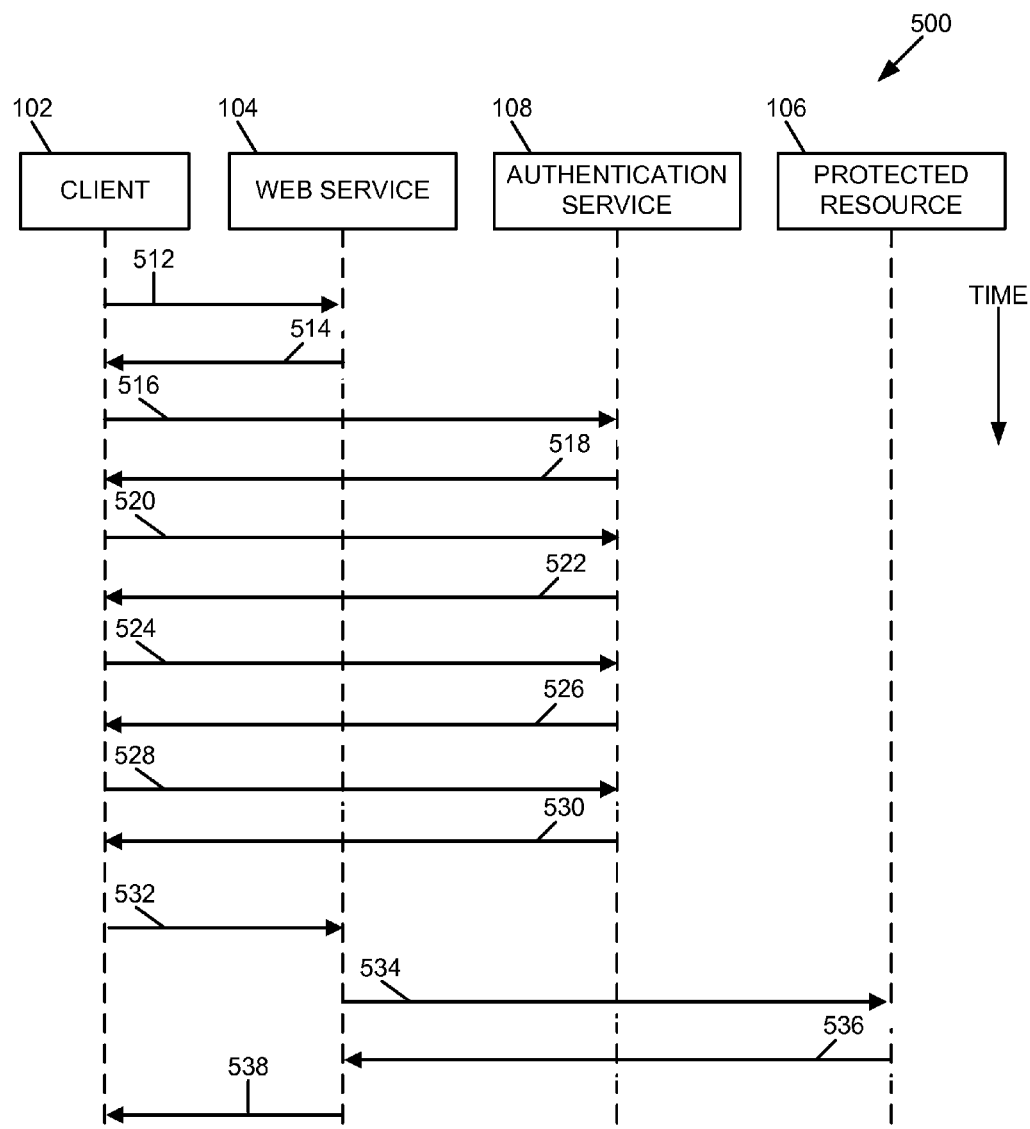
FIG. 5 is a flow chart illustrating an example method for controlling access to a protected resource.

FIG. 5 is a flow chart illustrating an example method 500 for controlling access to a protected resource. Method 500 involves client 102, Web service 104, authentication service 108, and protected resource 106. Although authentication service 108 is illustrated as a separate and distinct entity from the Web service 104, in some embodiments authentication service 108 and Web service 104 operate on the same computing system. In one embodiment, protected resource 106 is located on Web service 104. In yet another embodiment, protected resource 106 is located on another Web service, server, computer, or other computing system. At communication 512, client 102 submits a request for protected resource 106. Web service 104 receives this request. At communication 514, Web service 104 determines that authentication is necessary and responds with a fault indicating that at least one authentication process must be completed in order for the request to be processed. In possible embodiments, the fault can take the form of a Simple Object Access Protocol (SOAP) fault, as defined in the SOAP 1.2 specification. In other embodiments, the fault can take the form of any other type of data communication protocol. In further embodiments, the fault from Web service 104 will contain an address to an authentication service 108, such as a security token service endpoint.

At communication 516, client 102 sends a request for a security token to authentication service 108, claiming that the necessary authentication processes have been completed. In one embodiment, this request takes the form of a Web Services Trust (WS-Trust) Request Security Token Response Message as defined by the WS-Trust specification. In other embodiments, the request can take the form of other protocols. At communication 518, authentication service 108 responds to client 102 with a challenge for confirmation of identity. In some embodiments, the challenge takes the form of the challenges described with respect to FIG. 3. At communication 520, client 102 responds with a confirmation of identity. In some embodiments, the confirmation of identity takes the form of the confirmation describe with respect to FIG. 3. At communication 522, authentication service 108 responds to client 102 with a further challenge for confirmation of identity. In one embodiment, this challenge is in response to a failed confirmation of identity. In yet another embodiment, this challenge is necessary to perform multifactor authentication. At communication 524, client 102 responds to authentication service 108 with further confirmation of identity. This process may be repeated yet again with a challenge in communication 526 and confirmation of challenge 528. Although the set of challenges and confirmations is illustrated as being performed three times, in other embodiments such challenge and response communications are repeated any number of times. After authentication service 108 confirms the identity of client 102, authentication service 108 issues the requested security token to client 102 in communication 530.

At communication 532, client 102 re-submits the original request for a protected resource along with the security token. Web service 104 examines the request to ensure that it is the same as the original request and validates the security token to ensure that it is valid. At communication 534, Web service 104 processes the request made by client 102. In some embodiments, this processing involves fetching and/or updating protected resource 106. At communication 536, the result of the fetch and/or update on protected resource 106 is returned to Web service 104. At communication 538, Web service 104 responds to the request made by client 102.

Referring now to Table 1: Authentication Challenge Schema, a data structure for indicating that a message-specific authentication process is required for processing a request is provided. In some embodiments, the communications described in relation to FIG. 5 are communicated in the form of the data structure defined in Table 1, such as when a Web service, such as Web service 104, determines that a message-specific process is required for authenticating the user who initiated a request. In one embodiment, the service will return a SOAP fault, as defined in the SOAP 1.2 specification. In some embodiments, unlike traditional SOAP faults, the SOAP fault used to indicate that a message-specific authentication protocol is required will contain a context header containing an identifier by which the details of the original request and any authentication process that have been found to be associated with the request may be retrieved by the Web service. In another embodiment, the returned SOAP fault will also contain a Detail element that will signify the identity of the user on behalf of whom the request is being made. This is the identity that will be further authenticated. In yet another embodiment, the Detail element will also or alternatively provide the address of an authentication service, such as authentication service 108, which can issue a security token to the user confirming that the user has successfully completed each of the authentication processes associated with the request. In some embodiments, the address for the authentication service is the same as the address of the Web service. In other embodiments, the address for the authentication service is different from the address of the Web service.

TABLE 1

Authentication Challenge Schema

```
<?xml version='1.0' encoding='utf-8'?>
<xs:schema
 elementFormDefault='qualified'
 targetNamespace=
 'http://schemas.microsoft.com/2006/11/IdentityManagement'
 xmlns:xs='http://www.w3.org/2001/XMLSchema'
 xmlns:wsa=http://schemas.xmlsoap.org/ws/2004/08/addressing
 xmlns:idm='http://schemas.microsoft.com/2006/11/IdentityManagement'>
 <xs:import
  namespace='http://schemas.xmlsoap.org/ws/2004/08/addressing'/>
 <xs:complexType name='AuthenticationChallengeType'>
  <xs:sequence>
   <xs:element
    name='Challenge'
    nillable='true'
    minOccurs='0'>
     <xs:complexType>
      <xs:sequence>
       <xs:any
        minOccurs='0'
        processContents='lax' />
      </xs:sequence>
     </xs:complexType>
   </xs:element>
  </xs:sequence>
 </xs:complexType>
 <xs:element
  name='AuthenticationChallenge'
  nillable='true'
  type='idm:AuthenticationChallengeType' />
</xs:schema>
```

The schema shown in Table 1 includes a Challenge element and an AuthenticationChallenge element. The Challenge element is used to transfer to the client the information necessary to challenge the user to provide the required authentication data. In some embodiments, the client may be a Web browser that will display the challenge data to a user, to prompt the user to provide data in response to the challenge. For example, the challenge element may direct client 102 to display a text box prompting the user to enter a password. Other embodiments will prompt a user to provide authentication in the form of requesting an answer to a security question, requesting a DNA sample, fingerprint patterns, retinal patterns or some other unique identifier of the person using the client, requesting verification in the form of an object such as a key, security card, security token, credit card, or some other object unique to the person using the client, as described with reference to FIG. 3. In possible embodiments, the Authentication Challenge Schema will include an AuthenticationChallenge element that serves as a wrapper for the schema.

Referring now to Table 2: Authentication Challenge Response Schema, a data structure for responding to an authentication challenge is provided. The authentication service, such as authentication service 108, issues challenges to the user for authenticating information. In some embodiments, the challenges are made in accordance with the challenge framework defined in Section 10 of the WS-Trust specification. If the authentication service requires additional information to authenticate a user's identity, it will respond to a request for a security token message with a response as defined by the WS-Trust specification.

TABLE 2

Authentication Challenge Response Schema

```
<?xml version='1.0' encoding='utf-8'?>
<xs:schema
 elementFormDefault='qualified'
 targetNamespace=
 'http://schemas.microsoft.com/2006/11/IdentityManagement'
 xmlns:xs='http://www.w3.org/2001/XMLSchema'
 xmlns:wsa=http://schemas.xmlsoap.org/ws/2004/08/addressing
 xmlns:idm=
 'http://schemas.microsoft.com/2006/11/IdentityManagement'>
 <xs:import
  namespace='http://schemas.xmlsoap.org/ws/2004/08/addressing'/>
 <xs:complexType name='AuthenticationChallengeResponseType'>
  <xs:sequence>
   <xs:element
    name='Response'
    nillable='true'
    minOccurs='0'>
     <xs:complexType>
      <xs:sequence>
       <xs:any
        minOccurs='0'
        processContents='lax' />
      </xs:sequence>
     </xs:complexType>
   </xs:element>
  </xs:sequence>
 </xs:complexType>
 <xs:element
  name='AuthenticationChallengeResponse'
  nillable='true'
  type='idm:AuthenticationChallengeResponseType' />
</xs:schema>
```

The Authentication Challenge Response Schema includes a response element and an AuthenticationChallengeResponse element. The response element identifies to the authentication service the authentication information that is required from the client. This information is used by the authentication service, for example, to determine what challenges should be sent to the client to authenticate the client. The AuthenticationChallengeResponse element serves as a wrapper for the schema.

Figure 6:
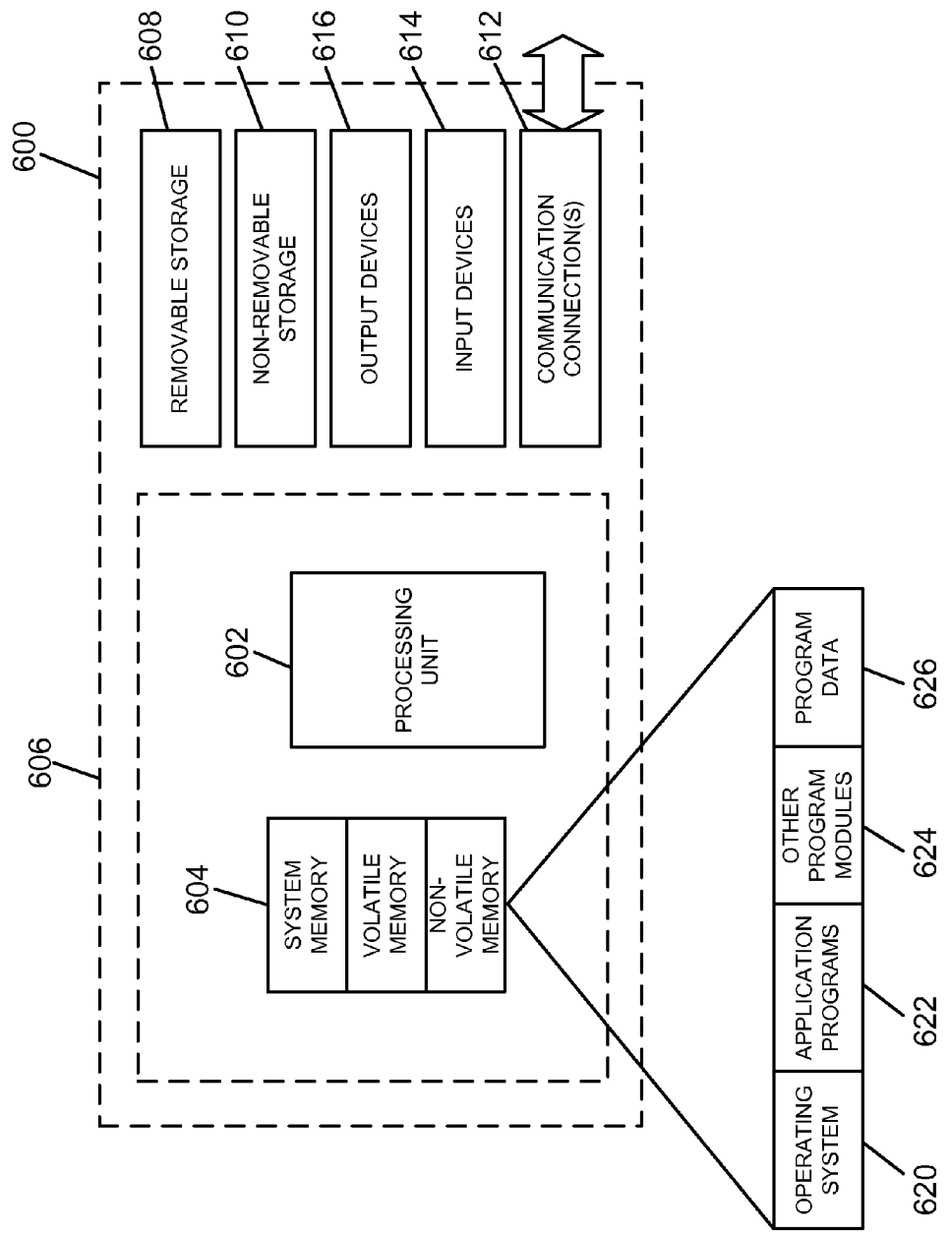
FIG. 6 is a block diagram of an exemplary computing system for implementing aspects of the present disclosure.

FIG. 6 is a block diagram of an exemplary computing system 600 for implementing aspects of the present disclosure. In one embodiment, computing system 600 is client 102. In another embodiment, computing system 600 is Web service 104. In another possible embodiment, computing system 600 is authentication service 108. In its most basic configuration, computing system 600 typically includes at least one processing unit 602 and memory 604. Depending on the exact configuration and type of computing system, memory 604 may be volatile (such as RAM), non-volatile (such as ROM, flash memory, etc.) or some combination of the two. This most basic configuration is illustrated in FIG. 6 by dashed line 606. Additionally, computing system 600 may also have additional features/functionality. For example, computing system 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can accessed by computing system 600. Any such computer storage media may be part of computing system 600.

Computing system 600 may also contain communications connection(s) 612 that allow the computing system to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 600 may also have input device(s) 614 such as keyboard, mouse, pen, voice input device, touch input device, etc. In some embodiments, input devices also (or alternatively) include, for example, biometric identifiers, sensors, detectors, card readers, and the like. Output device(s) 616 such as a display, speakers, printer, etc. may also be included. All these devices are well know in the art and need not be discussed at length here.

In some embodiments, memory 604 includes one or more of operating system 620, application programs 622, other program modules 624, and program data 626. In some embodiments, global data, client-specific data, and transformation rules may each be stored in memory 604, removable storage 608, non-removable storage 610, or any other computer storage media described herein.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present disclosure. Therefore, the specific structure, acts, or media are disclosed only as illustrative embodiments.

What is claimed is:

1. A computing system for controlling access to a protected Web service resource, the computing system comprising:
a communication device for communicating across a communication network having a type;
a processor communicatively connected to the communication device; and
memory storing program instructions, which when executed by the processor cause the computing system to:
receiving a first request from a client to access the protected Web service resource from the communication network, the first request being associated with a first authentication level, a type and one or more properties of the Web service resource, and further including credentials of the client;
evaluating the first request upon receiving the first request, and determining whether authentication is required to access the protected Web service resource by evaluating the type of the communication network, the type and the one or more properties of the protected Web service resource associated with the first request, and the credentials of the client associated with the first request;
responding with a fault generated by the processor indicating that at least one authentication process must be completed in order for the first request to be processed when it is determined by the processor that authentication is required;
receiving a first authentication token from the client after the client has been authenticated by an authentication service according to a first factor and using the first authentication token to determine that the client has been authenticated according to the first factor;
granting the first request to access the protected Web service resource after determining that the client requires authentication and has been authenticated according to the first factor, and that authentication according to the first factor is sufficient for the first authentication level;
receiving a second request from the client to access the protected Web service resource from the communication network, the second request being associated with a second authentication level higher than the first authentication level;
denying the second request to access the protected Web service resource, based on the first authentication token according to the first factor being insufficient for the second authentication level;
responding with a second fault generated by the processor indicating that at least one additional authentication process must be completed in order for the second request to be processed when it is determined by the processor that authentication is required;
receiving a second authentication token from the client after the client has been authenticated by the authentication service according to a second factor and using the second authentication token to determine that the client has been authenticated according to the second factor; and
granting the second request to access the protected Web service resource after determining that the client has been authenticated according to the second factor, and that authentication according to the second factor is sufficient for the second authentication level.

2. The computing system of claim 1, wherein the first factor is selected from the group comprising: a password, an answer to a security question, a biometric identifier, an object, and client specific information.

3. The computing system of claim 1, wherein the second factor is different from the first factor.

4. The computing system of claim 1, wherein the method further comprises receiving a first authentication token from the client after the client has been authenticated by an authentication service according to the first factor and using the first authentication token to determine that the client has been authenticated according to the first factor.

5. The computing system of claim 4, wherein determining that the client has been authenticated comprises:

decrypting the first authentication token with a public key of the authentication service; and determining that a claim made by the authentication service in the first authentication token satisfies a condition for access.

6. The computing system of claim 1, wherein granting the second request to access the protected Web service resource is based on an evaluation of the second authentication token.

7. A physical computer readable storage device containing computer executable instructions which when executed by a computer perform a method of controlling access to a protected resource, the protected resource having a type and one or more properties, the method comprising:

receiving a first request to access the protected resource from a communication network with a computing device from a client identifying the protected resource of a Web service, the first request being associated with a first authentication level, a type and one or more properties of the protected resource, and further including credentials of the client, wherein the communication network has a type;

evaluating the first request upon receiving the first request, and determining whether authentication is required to access the protected resource by evaluating the type of the communication network, the type and one or more properties of the protected resource associated with the request, and the credentials of the client associated with the first request;

responding with a fault generated by the Web service indicating that the first authentication level must be satisfied in order for the request to be processed, the first authentication level being associated with at least one authentication process that must be completed in order for the first authentication level to be satisfied;

receiving a first authentication token from the client after being authenticated from the authentication service according to a first factor;

using the first authentication token to determine whether the client has been authenticated according to the first factor;

determining whether the authentication meets the first authentication level so as to be sufficient to grant the request;

granting the first request to access the protected resource when the authentication is sufficient to grant the request;

denying the first request when the authentication is insufficient to grant the request;

receiving a second request from the client to access the protected resource, the second request identifying the protected resource of the Web service and being associated with a second authentication level and including the first authentication token at the first authentication level;

determining whether the first authentication token at the first authentication level is sufficient to grant the second request;

granting the second request when the second authentication level is lower than or equal to the first authentication level so as to be sufficient to grant the second request;

denying the second request when the second authentication level is higher than the first authentication level so as to be insufficient to grant the second request and responding with a second fault generated by the Web service indicating that at least one additional authentication process must be completed in order for the second request to be granted; and when the second request is denied, receiving a second authentication token from the client after the client has been authenticated by the authentication service according to a second factor and using the second authentication token to determine that the client has been authenticated according to the second factor.

8. The physical computer readable storage device of claim 7, wherein the authentication token is encrypted using public key cryptography.

9. The physical computer readable storage device of claim 7, the method further comprising granting access to the protected resource of the Web service after granting the request if the authentication is sufficient.

10. The physical computer readable storage device of claim 7, wherein denying the request comprises communicating the denial to the client with a message, the message including information about the authentication service configured to authenticate the client.

11. The physical computer readable storage device of claim 7, wherein denying the request comprises sending a fault message according to a Simple Object Access Protocol, and wherein receiving an authentication comprises receiving a Web Services Trust Request Security Token Response Message according to a Web Services Trust specification.

* * * * *